(12) United States Patent
Ejiri

(10) Patent No.: US 8,429,427 B2
(45) Date of Patent: Apr. 23, 2013

(54) STORAGE DEVICE

(75) Inventor: Taichi Ejiri, Nagoya (JP)

(73) Assignee: Buffalo Inc., Nagoya (JP)

( * ) Notice: Subject to any disclaimer, the term of this patent is extended or adjusted under 35 U.S.C. 154(b) by 526 days.

(21) Appl. No.: 12/749,380

(22) Filed: Mar. 29, 2010

(65) Prior Publication Data

US 2010/0250970 A1 Sep. 30, 2010

(30) Foreign Application Priority Data

Mar. 31, 2009 (JP) .................................. 2009-85541

(51) Int. Cl.
*G06F 11/30* (2006.01)

(52) U.S. Cl.
USPC ....................................................... 713/193

(58) Field of Classification Search .............. 713/2, 193; 726/16
See application file for complete search history.

(56) References Cited

U.S. PATENT DOCUMENTS

| 7,434,251 | B2 * | 10/2008 | Ooi et al. ........................ 726/9 |
| 7,840,794 | B2 * | 11/2010 | Hashiguchi ...................... 713/2 |

FOREIGN PATENT DOCUMENTS

| JP | 2002-14740 | 1/2002 |
| JP | 2002-222022 | 8/2002 |
| JP | 2003-99147 | 4/2003 |
| JP | 2005-70968 | 3/2005 |

* cited by examiner

*Primary Examiner* — Samson Lemma
(74) *Attorney, Agent, or Firm* — Beyer Law Group LLP

(57) ABSTRACT

The storage device used in connection with an information processing apparatus is provided. The storage device includes: an authentication storage area storing an authentication program in advance, wherein the authentication program is executed to authenticate whether each user operating the information processing apparatus is an approved user; an operating system storage area storing an operating system in advance, wherein the operating system is encrypted and is used by the information processing apparatus; an access controller configured to control accesses the authentication storage area and the operating system storage area from the information processing apparatus; and a decoder configured to decrypt the encrypted operating system, wherein upon notification of successful authentication representing that the user is authenticated as the approved user by the authentication program, the access controller allows an access the operating system storage area from the information processing apparatus.

4 Claims, 17 Drawing Sheets

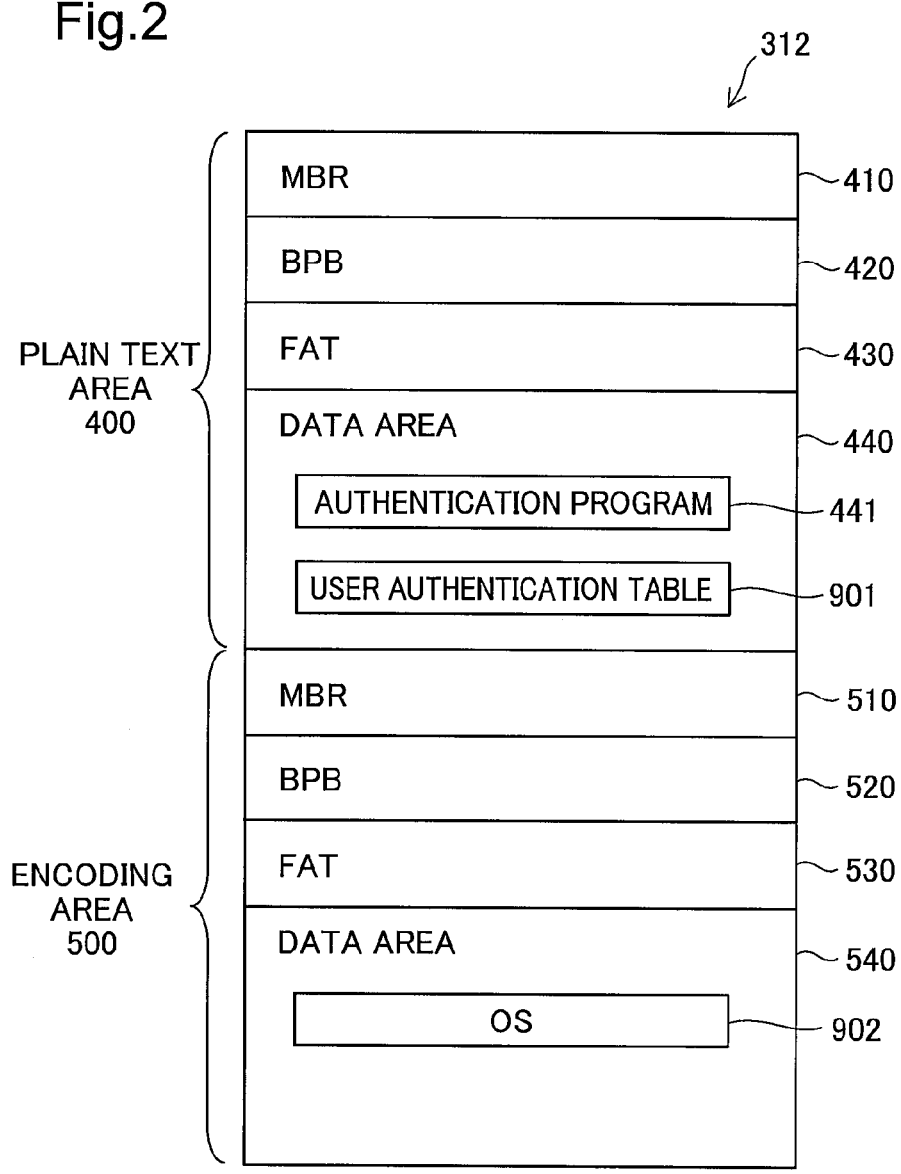

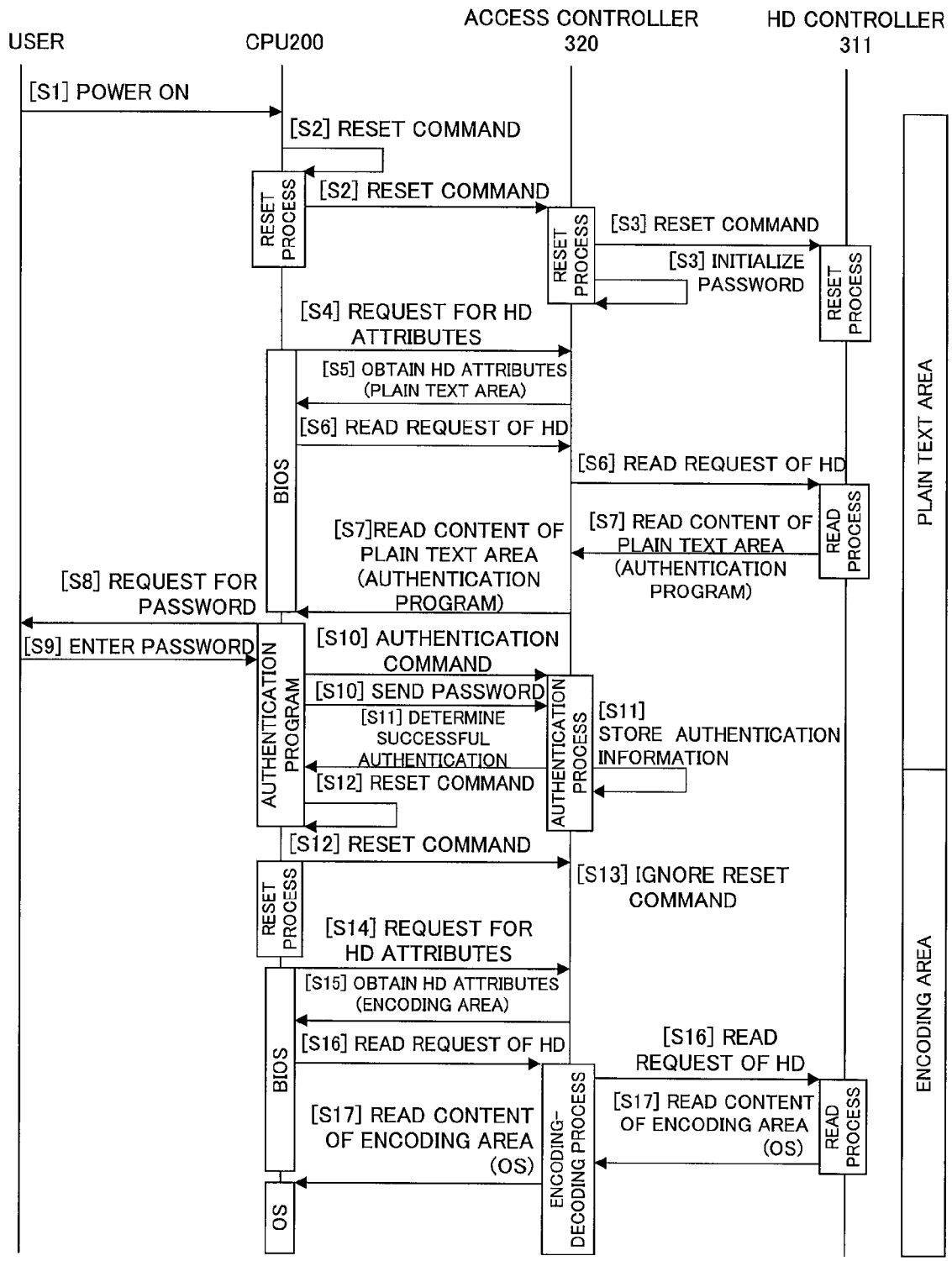

VISIBLE AREA AFTER POWER SUPPLY TO PC (STEP S5)

VISIBLE AREA AFTER SUCCESSFUL AUTHENTICATION (STEP S15)

Fig.13

<AREA SPECIFICATION TABLE>  ~332

| LUN NUMBER :LN | PHYSICAL AREA INFORMATION | | | LOGICAL AREA INFORMATION | | |
|---|---|---|---|---|---|---|
| | TOTAL CAPACITY :PB | START ADDRESS :PSA | END ADDRESS :PEA | TOTAL CAPACITY :LB | START ADDRESS :LSA | END ADDRESS :LEA |
| 0 | 10GB | 00000000 | 11111111 | 10GB | 00000000 | 11111111 |
| 1 | 40GB | 11111111 | 55555555 | 40GB | 00000000 | 44444444 |

STORAGE DEVICE

CROSS-REFERENCE TO RELATED APPLICATIONS

The present application claims the priority based on Japanese Patent Application No. 2009-85541 filed on Mar. 31, 2009, the disclosure of which is hereby incorporated by reference in its entirety.

BACKGROUND OF THE INVENTION

1. Field of the Invention

The present invention relates to a storage device having an operating system stored therein.

2. Description of the Related Art

Several operating system activation methods and devices utilizing such activation methods have been proposed.

In order to assure the security, these conventional methods and devices typically perform authentication at the time of activation of an operating system (hereafter may be abbreviated as 'OS'). Some processing is then required for a storage unit with a BIOS or an OS stored therein. One available technique for the enhanced security is providing an additional function of prohibiting activation of the OS until successful boot-time authentication for a boot program of a hard disk. This conventional technique, however, readily analyze information stored in a hard disk when the hard disk is recognized as a slave hard disk of another computer.

Another available technique for the enhanced security is encrypting the whole storage of a hard disk. Such encryption, however, requires development of an exclusive hard disk driver corresponding to each OS. The resulting dependency on the OS or the hardware configuration may, however, have some disadvantages, for example, the lowered performance and the difficulty in encrypting the whole storage of the hard disk. Still another available technique for the enhanced security is providing the BIOS with an additional authentication function at the time of activation of an OS and locking the storage of the hard disk itself with an ATA (advanced technology attachment) security command. This technique is, however, not applicable to the existing computers having the BIOS implemented without the additional authentication function at the time of activation of the OS. The BIOS-based authentication is not performable in combination with physical authentication utilizing, for example, an external storage medium. This technique accordingly has a possibility of failed protection of information stored in the hard disk in the event of leakage or decoding of a password.

SUMMARY

An object of the present invention is to provide technology that makes possible an OS to be activated based on a result of authentication implemented according to an authentication program stored in a storage device and enhances security of information stored in the storage device.

According to one aspect of the present invention, a storage device used in connection with an information processing apparatus is provided. A storage device comprises: an authentication storage area storing an authentication program in advance, wherein the authentication program is executed to authenticate whether each user operating the information processing apparatus is an approved user; an operating system storage area storing an operating system in advance, wherein the operating system is encrypted and is used by the information processing apparatus; an access controller configured to control accesses the authentication storage area and the operating system storage area from the information processing apparatus; and a decoder configured to decrypt the encrypted operating system, wherein upon notification of successful authentication representing that the user is authenticated as the approved user by the authentication program, the access controller allows an access the operating system storage area from the information processing apparatus.

According to this configuration, in the case of successful authentication representing that the user is authenticated as the approved user by the authentication program, the storage device according to this aspect of the invention allows an access from the information processing apparatus to the operating system storage area. This arrangement enables the OS to be activated, based on the result of authentication according to the authentication program stored in the storage device. The operating system is stored in advance in an encrypted state. This arrangement effectively enhances the security of information stored in the storage device.

Another embodiment of the present invention, the storage device may be configured to make one of the authentication storage area and the operating system storage area visible and the other area invisible from the information processing apparatus, wherein after the information processing apparatus is powered on, the access controller makes the authentication storage area visible and the operating system storage area invisible, thereby allowing the authentication program to be activated and implemented on the information processing apparatus, and after the successful authentication by the authentication program, the access controller makes the authentication storage area invisible and the operating system storage area visible and controls the decoder to decrypt the operating system, thereby allowing the operating system to be activated and implemented on the information processing apparatus.

According to this configuration, the authentication program is activated and implemented immediately after the information processing apparatus is powered on connecting with the storage device of this application. After the successful authentication by the authentication program, the operating system is decrypted and activated. This arrangement enables the OS to be activated, based on the result of authentication according to the authentication program stored in the storage device and effectively enhances the security of information stored in the storage device.

Another embodiment of the present invention, the storage device wherein the authentication storage area and the operating system storage area are set to have identical attributes including a device name and a device size.

According to this configuration, the storage device of this embodiment, a region assigned to the authentication storage area and a region assigned to the operating system storage area are set to have identical attributes including a device name and a device size. This arrangement effectively prevents malfunction of the information processing apparatus.

Another embodiment of the present invention, the storage device wherein in response to an attribute request for an attribute including a device size of the authentication storage area from the information processing apparatus, the access controller sends back a false device size that is greater than an actual device size of the authentication storage area.

According to this configuration, the storage device of this embodiment is allowed to send back the false device size that is greater than the actual device size of the authentication storage area, in response to an inquiry about the device size of the authentication storage area from the information processing apparatus. This arrangement effectively prevents unnecessary expansion of the actual device size of the authentication storage area.

Another embodiment of the present invention, the storage device wherein the authentication storage area and the operating system storage area are assigned to different partitions, the storage device having a master boot record including a partition table that stores therein information on the respective partitions, wherein after the information processing apparatus is powered on, the access controller sets the master boot record to preferentially activate a partition assigned to the authentication storage area, thereby allowing the authentication program to be activated and implemented on the information processing apparatus, and after the successful authentication by the authentication program, the access controller sets the master boot record to preferentially activate a partition assigned to the operating system storage area and controls the decoder to decrypt the operating system, thereby allowing the operating system to be activated and implemented on the information processing apparatus.

According to this configuration, the authentication program is activated and implemented immediately after the information processing apparatus is powered on, connecting with the storage device of this application. After the successful authentication by the authentication program, the operating system is decrypted and activated. This arrangement enables the OS to be activated, based on the result of authentication according to the authentication program stored in the storage device and effectively enhances the security of information stored in the storage device.

Another embodiment of the present invention, the storage device wherein the access controller makes the partition assigned to the authentication storage area visible after the information processing apparatus is powered on, and makes the partition assigned to the authentication storage area invisible after the successful authentication by the authentication program.

According to this configuration, after the successful authentication by the authentication program, the storage device of this embodiment makes the partition assigned to the authentication storage area invisible. This arrangement effectively prevents malfunction of the information processing apparatus.

Another embodiment of the present invention, the storage device wherein the authentication storage area and the operating system storage area are assigned to different logical units, the storage device comprising an area specification module that stores therein information on assignment of the logical units including logical unit numbers for identifying the respective logical units, wherein after the information processing apparatus is powered on, the access controller sets the logical unit number stored in the area specification module to preferentially activate a logical unit assigned to the authentication storage area, thereby allowing the authentication program to be activated and implemented on the information processing apparatus, and after the successful authentication by the authentication program, the access controller sets the logical unit number stored in the area specification module to preferentially activate a logical unit assigned to the operating system storage area and controls the decoder to decrypt the operating system, thereby allowing the operating system to be activated and implemented on the information processing apparatus.

According to this configuration, the authentication program is activated and implemented immediately after the information processing apparatus is powered on connecting with the storage device of this application. After the successful authentication by the authentication program, the operating system is decrypted and activated. This arrangement enables the OS to be activated, based on the result of authentication according to the authentication program stored in the storage device and effectively enhances the security of information stored in the storage device.

Another embodiment of the present invention, the storage device wherein after the information processing apparatus is powered on, the access controller makes the logical unit assigned to the authentication storage area accessible and the logical unit assigned to the operating system storage area inaccessible, and after the successful authentication by the authentication program, the access controller makes the logical unit assigned to the authentication storage area inaccessible and the logical unit assigned to the operating system storage area accessible.

According to this configuration, after the successful authentication by the authentication program, the storage device of this embodiment makes the logical unit assigned to the authentication storage area inaccessible. This arrangement effectively prevents malfunction of the information processing apparatus.

Another embodiment of the present invention, the storage device further including an authentication state storage unit configured to store a result of authentication, wherein after the successful authentication by the authentication program, when a reset command issued for activation of the operating system is received from the information processing apparatus subsequent to storage of the status of successful authentication into the authentication state storage unit, the access controller ignores the reset command under a condition of recognizing both the storage of the status of successful authentication in the authentication state storage unit and inactivation of the operation system on the information processing apparatus.

According to this configuration, in the case where the storage content in the authentication state storage unit represents the status of successful authentication, the storage device of this application ignores the reset command issued for activation of the operating system by the information processing apparatus. This arrangement effectively prevents the storage device from being reset in the state of storage of the authentication information. Namely the storage device of this application desirably protects the authentication information from being deleted in the course of the reset process.

Another embodiment of the present invention, the storage device further including an authentication state storage unit configured to store a result of authentication, wherein the access controller resets the storage device in response to a reset command issued for activation of the operating system from the information processing apparatus and subsequently stores the status of successful authentication into the authentication state storage unit.

According to this configuration, after performing the reset process of the storage device, the storage device of this application stores the status of successful authentication into the authentication state storage unit. This arrangement effectively prevents the storage device from being reset in the state of storage of the authentication information. Namely the storage device of this application desirably protects the authentication information from being deleted in the course of the reset process.

The principle of the present invention is actualized by diversity of applications, for example, the storage device having any of the above arrangements, a system including such a storage device, an OS activation method adopted on such a storage device, computer usable mediums including the functions of the device or the system and the functional steps of the method, and recording media with such computer programs recorded therein.

BRIEF DESCRIPTION OF THE DRAWINGS

FIG. 2 is an explanatory view showing the schematic structure of the HD storage unit in the first embodiment;

FIG. 3 is an explanatory view showing one example of the user authentication table;

FIG. 4 is a sequence diagram showing a flow of an OS activation process implemented in the first embodiment;

FIG. 13 is an explanatory view showing one example of the area specification table after the PC is powered on;

DESCRIPTION OF THE PREFERRED EMBODIMENT

Next, aspects of the present invention will be described in the following order on the basis of embodiments:

A. First Embodiment

Figure 1:
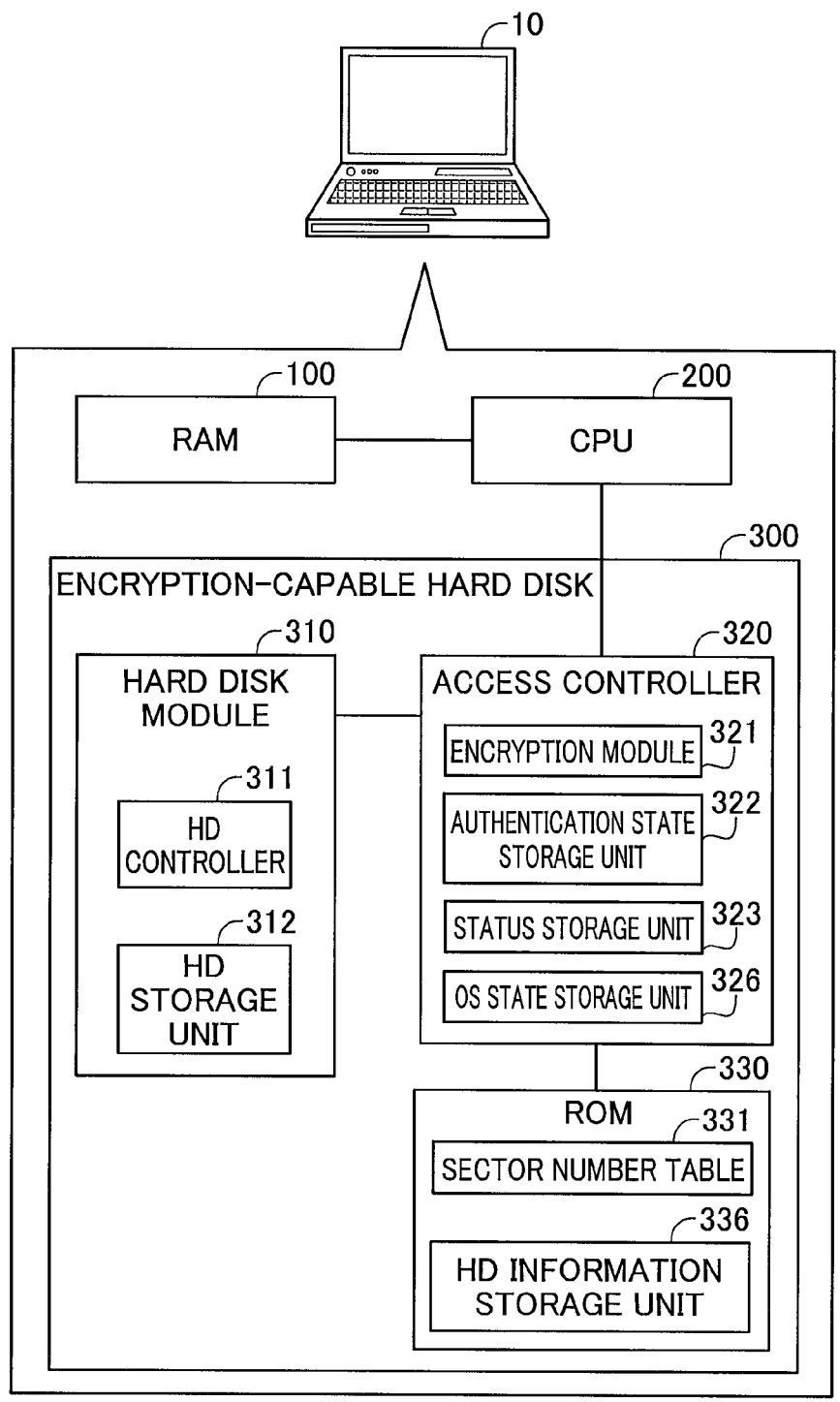
FIG. 1 is an explanatory view schematically illustrating the configuration of an information processing apparatus connecting with a storage device in accordance with one embodiment of the invention.

FIG. 1 is an explanatory view schematically illustrating the configuration of an information processing apparatus connecting with a storage device in accordance with one embodiment of the invention. A computer 10 functioning as the information processing apparatus (hereafter may simply be referred to as 'PC') includes a RAM 100, a CPU 200, and an encryption-capable hard disk 300 as the storage device (hereafter may simply be referred to as 'hard disk'). The hard disk 300 has a hard disk module 310, an access controller 320, and a ROM 330. The hard disk module 310 includes an HD controller 311 and an HD storage unit 312. The HD storage unit 312 is made of a storage medium, and the HD controller 311 is configured to control the operations of the HD storage unit 312.

The access controller 320 includes an encryption module 321, an authentication state storage unit 322, a status storage unit 323, and an OS state storage unit 326. The access controller 320 has a control function to control accesses to an authentication storage area and to an operating system storage area (explained later). The function of the access controller 320 will be discussed later. The encryption module 321 constructed as a decoder has encoding and decoding functions to encrypt and decrypt data stored in the HD storage unit 312. The combination of the authentication state storage unit 322 with the status storage unit 323 has a function of storing a status representing either successful authentication or unsuccessful authentication determined according to a preset authentication program as discussed later in detail. The OS state storage unit 326 has a function of storing a state representing either activation or inactivation of the operating system in the PC 10. In this embodiment, there are two different OS states to be settable: a value '0' representing 'OS active state' and a value '1' representing 'OS inactive state'. The value '1' representing 'OS inactive state' is set in the OS state storage unit 326 as an initial value immediately after the PC 10 is powered on. These settings of the OS states are only illustrative and not restrictive in any sense. The OS states may be determined arbitrarily.

The ROM 330 is a memory device including a sector number table 331 and an HD information storage unit 336. The sector number table 331 is structured to include addresses of first sectors in a plain text area and an encoding area (explained below) previously stored therein. The HD information storage unit 336 stores therein attributes of the hard disk including a device name and a device size of the HD storage unit 312.

FIG. 2 is an explanatory view showing the schematic structure of the HD storage unit 312 in the first embodiment. The HD storage unit 312 includes a plain text area (400) as the authentication storage area and an encoding area (500) as the operating system storage area. The plain text area (400) includes an MBR (master boot record) 410, a BPB (BIOS parameter block) 420, an FAT (file allocation table) 430, and a data area 440. The encoding area (500) includes an MBR 510, a BPB 520, an FAT 530, and a data area 540. The MBRs 410 and 510 are sectors read first at the time of start-up and are constructed to store information relating to a start-up. The BPBs 420 and 520 are constructed to store physical attributes of the hard disk, for example, the number of sectors per cluster. The FATs 430 and 530 are constructed to store disk management data used for recording, for example, file location information.

The data area 440 of the plain text area 400 has an authentication program 441 and a user authentication table 901 previously stored therein. The authentication program 441 is implemented to authenticate each user operating the PC 10 as an approved user as discussed later in detail. The details of the user authentication table 901 will be discussed later. An OS 902 used on the PC 10 is stored in advance in an encrypted state in the data area 540 of the encoding area 500. The OS 902 may be a known operating system, for example, Windows (registered trademark) by Microsoft Corporation.

The access controller 320 performs access control to make only the plain text area 400 visible from the PC 10 at the time of start-up of the PC 10 and to make only the encoding area 500 visible from the PC 10 after the successful authentication by the authentication program 441. The access controller 320 refers to the storage content in the authentication state storage unit 322 and determines which of the plain text area 400 and the encoding area 500 is to be made visible.

FIG. 3 is an explanatory view showing one example of the user authentication table 901. The user authentication table 901 includes user names UN and passwords UP. A field of user name UN stores the names of respective users registered. A field of password UP stores passwords set for the respective users. The user authentication table 901 is used in an authentication process discussed later.

FIG. 4 is a sequence diagram showing a flow of an OS activation process implemented in the first embodiment. In response to the user's power-on operation of the PC 10 (step S1), the CPU 200 of the PC 10 starts an initialization process to reset the CPU 200 itself and issues a reset command to the access controller 320 in the hard disk 300 (step S2). The access controller 320 receives the reset command and determines whether the storage content in the authentication state storage unit 322 represents a status of successful authentication. At this moment, the storage content in the authentication state storage unit 322 does not represent the status of successful authentication, so that the access controller 320 issues a reset command to the HD controller 311 and performs a password initialization process (step S3). A concrete procedure of the password initialization process resets a key set by the encryption module 321 and initializes the storage contents both in the authentication state storage unit 322 and the status storage unit 323.

Figure 5A:
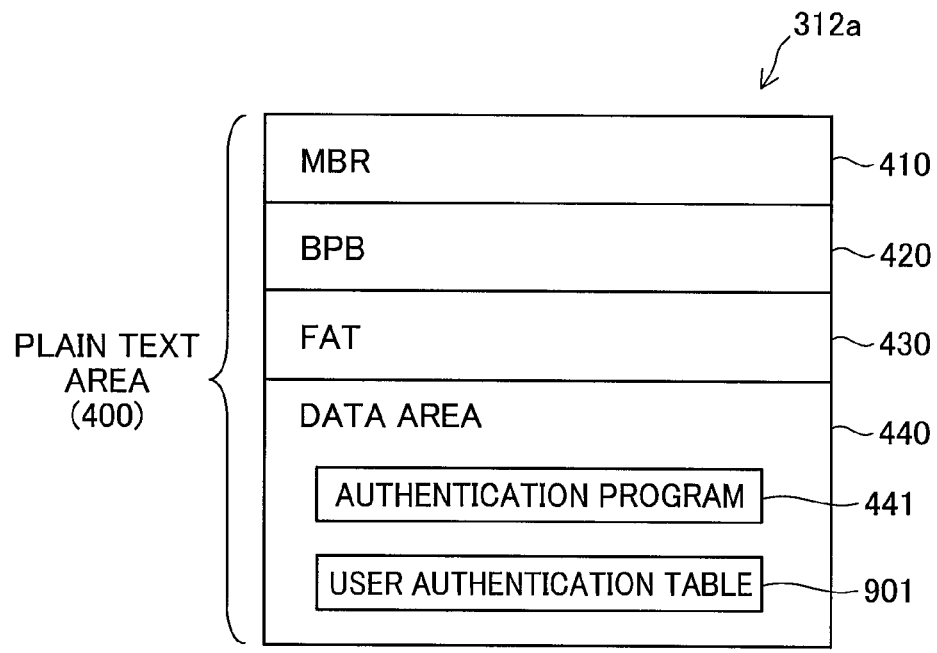
FIGS. 5A and 5B are explanatory views showing the schematic structures of the HD storage unit seen from the PC.
Figure 5B:
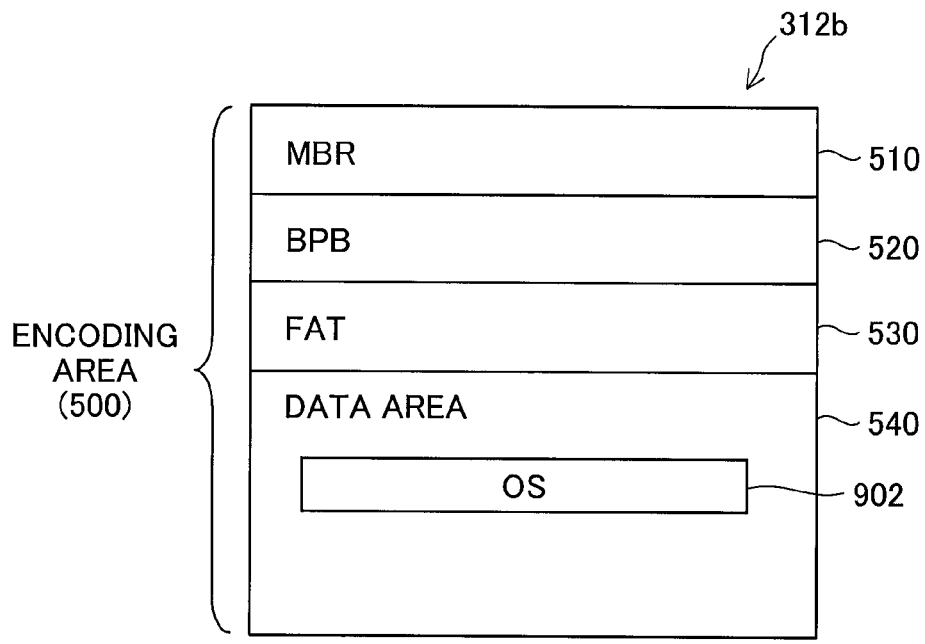

FIGS. 5A and 5B are explanatory views showing the schematic structures of the HD storage unit 312 seen from the PC 10. The BIOS implemented by the CPU 200 issues an attribute request to the access controller 320 to obtain attributes of the hard disk including the device name and the device size (step S4). In response to reception of the attribute request, the access controller 320 sends back a device name and a device size of a plain text area stored in the HD information storage unit 336 of the ROM 330 (step S5). FIG. 5A shows a visible area seen from the CPU 200 in this state. The BIOS subsequently issues a read request via the access controller 320 to read the hard disk (step S6). According to a concrete procedure, the BIOS activates a start-up program stored in the MBR 410, and the activated start-up program informs the BIOS of a first sector of the authentication program 441. The BIOS then issues a read request of the authentication program 441. In response to reception of the read request, the HD controller 311 sends the authentication program 441 via the access controller 320 (step S7).

Figure 6:
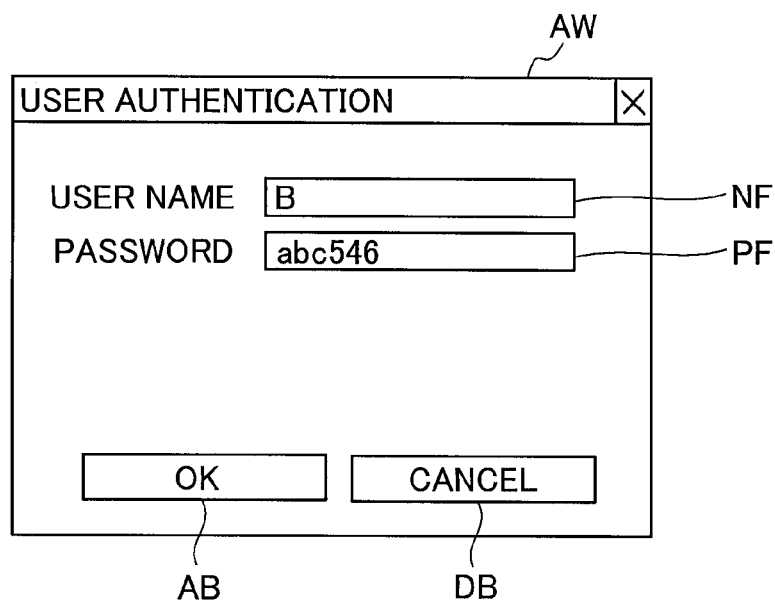
FIG. 6 is an explanatory view showing one example of an authentication window open in the authentication process.

FIG. 6 is an explanatory view showing one example of an authentication window open in the authentication process. A user authentication window AW includes a user name entry field NF, a password entry field PF, an OK button AB, and a Cancel button DB. The CPU 200 receives the authentication program 441 and executes the received authentication program 441 to perform an authentication process. According to a concrete procedure, the CPU 200 opens the user authentication window AW (FIG. 6) on the screen of the PC 10 and requests a user to enter a user name and a password (step S8). When the user enters the user name and the password and subsequently presses the OK button AB (step S9), the CPU 200 issues an authentication command to the access controller 320. According to a concrete procedure, the CPU 200 sends a value entered in the user name entry field NF and a value entered in the password entry field PF to the access controller 320 (step S10).

In response to reception of the authentication command, the access controller 320 performs the authentication process. The authentication process determines whether any entry corresponding to the received combination of the user name and the password exists in the user authentication table 901 (FIG. 3). The access controller 320 determines successful authentication in the case of existence of such an entry and determines unsuccessful authentication in the case of non-existence of such an entry. The access controller 320 sends back the result of the authentication process to the CPU 200. Upon determination of the successful authentication, the access controller 320 stores authentication information (step S11). According to a concrete procedure, the access controller 320 stores a value '1' representing a 'status of successful authentication' into both the authentication state storage unit 322 and the status storage unit 323. In this embodiment, the authentication information is defined by either a value '0' representing a 'status of unsuccessful authentication' or the value '1' representing the 'status of successful authentication'. These settings of the authentication information are only illustrative and not restrictive in any sense. The authentication information may be determined arbitrarily.

After the successful authentication by the authentication program 441, the CPU 200 resets the CPU 200 itself and issues a reset command to the access controller 320 (step S12). The reset command is issued to allow for activation of the OS 902. Upon satisfaction of all the conditions given below, the access controller 320 ignores this reset command (step S13):

Condition 1) The storage content in the authentication state storage unit 322 represents the status of successful authentication;

Condition 2) The storage content in the OS state storage unit 326 represents the OS inactive state; and Condition 3) The access controller 320 receives the reset command from the CPU 200.

Such ignorance effectively prevents the storage device from being reset in the state of storage of the authentication information. Namely this sequence of control operations desirably protects the authentication information from being deleted in the course of the reset process.

After the reset process of the CPU 200, the BIOS implemented by the CPU 200 issues an attribute request to the access controller 320 to obtain the attributes of the hard disk including the device name and the device size (step S14). In response to reception of the attribute request, the access controller 320 refers to the storage content in the status storage unit 323. Since the storage content in the status storage unit 323 represents the status of successful authentication, the access controller 320 sends back a device name and a device size of an encoding area stored in the HD information storage unit 336 of the ROM 330 (step S15). FIG. 5B shows a visible area seen from the CPU 200 in this state. The BIOS subsequently issues a read request via the access controller 320 to read the hard disk (step S16 in FIG. 4). According to a concrete procedure, the BIOS activates a start-up program stored in the MBR 510, and the activated start-up program informs the BIOS of a first sector of the OS 902. The BIOS then issues a read request of the OS 902. In response to reception of the read request, the HD controller 311 sends the OS 902 to the access controller 320. The access controller 320 receives the OS 902, decrypt the OS 902 by means of the encryption module 321, and sends the decrypted OS 902 to the CPU 200

(step S17). The CPU 200 receives the decrypted OS 902 and activates the received OS 902. This sequence of control operations enables the operating system to be activated on the PC 10. After activation of the operating system, the CPU 200 notifies the access controller 320 of the activation of the operating system. The access controller 320 notified of the activation of the operating system stores the value '0' representing the 'OS active state' into the OS state storage unit 326. The access controller 320 may alternatively detect the activation of the operating system, in response to a reading operation of a sector with the OS 902 stored therein, in place of the notification by the CPU 200.

TABLE 1

| | AFTER POWER SUPPLY | AFTER SUCCESSFUL AUTHENTICATION | AFTER ACTIVATION OF OS |
|---|---|---|---|
| AUTHENTICATION STATE STORAGE UNIT 322 | 0 | 1 | 1 |
| OS STATE STORAGE UNIT 326 | 1 | 1 | 0 |

Table 1 shows one example of the storage contents in the authentication state storage unit 322 and the OS state storage unit 326 after the PC 10 is powered on, after the successful authentication by the authentication program 441, and after the activation of the operating system.

One modified application may combine the functions of these two storage units (the authentication state storage unit 322 and the OS state storage unit 326) to one integral state storage unit. One example of the storage contents in the integral state storage unit having the combined functions of the two storage units is shown in Table 2.

TABLE 2

| | AFTER POWER SUPPLY | AFTER SUCCESSFUL AUTHENTICATION | AFTER ACTIVATION OF OS |
|---|---|---|---|
| STATE STORAGE UNIT | 0 | 1 | 0 |

As in the illustrated example of Table 1, in the illustrated example of Table 2, a value '1' representing a 'status of successful authentication' is stored into the integral state storage unit after the successful authentication by the authentication program 441. The access controller 320 is subsequently notified of the activation of the operating system and stores a value '0' representing an 'OS active state' into the integral state storage unit. In this modified application, upon satisfaction of all the conditions given below, the access controller 320 may ignore the reset command at step S13 in FIG. 4:

Condition 1) The storage content in the state storage unit represents the status of successful authentication; and Condition 3) The access controller 320 receives the reset command from the CPU 200.

The hard disk 300 is constructed to make one of the plain text area assigned to the authentication storage area and the encoding area assigned to the operating system storage area visible from the PC 10. Such visibility is attained according to the following sequence of control operations implemented by the access controller 320:

After PC 10 is Powered On: The control sends back the attributes of the plain text area, in response to the attribute request from the BIOS (step S4 in FIG. 4). This response makes the plain text area visible and the encoding area invisible. The hard disk recognized by the CPU 200 in this state is an HD storage unit 312a shown in FIG. 5A.

After Successful Authentication by Authentication Program 441: The control sends back the attributes of the encoding area, in response to the attribute request from the BIOS (step S14 in FIG. 4). This response makes the plain text area invisible and the encoding area visible. The hard disk recognized by the CPU 200 in this state is an HD storage unit 312b shown in FIG. 5B.

The plain text area and the encoding area are preferably structured to have the identical attributes of the hard disk including the device name and the device size. This arrangement enables the CPU 200 to recognize the identical attributes of the hard disk before and after the authentication and thereby prevents malfunction of the CPU 200.

As described above, in the case of successful authentication representing that the user is authenticated as the approved user by the authentication program, the control flow of the first embodiment allows an access from the information processing apparatus to the operating system storage area. This arrangement enables the OS to be activated, based on the result of authentication according to the authentication program stored in the storage device. The operating system is stored in advance in the encrypted state. This arrangement effectively enhances the security of the information stored in the storage device.

B. Second Embodiment

Figure 7:
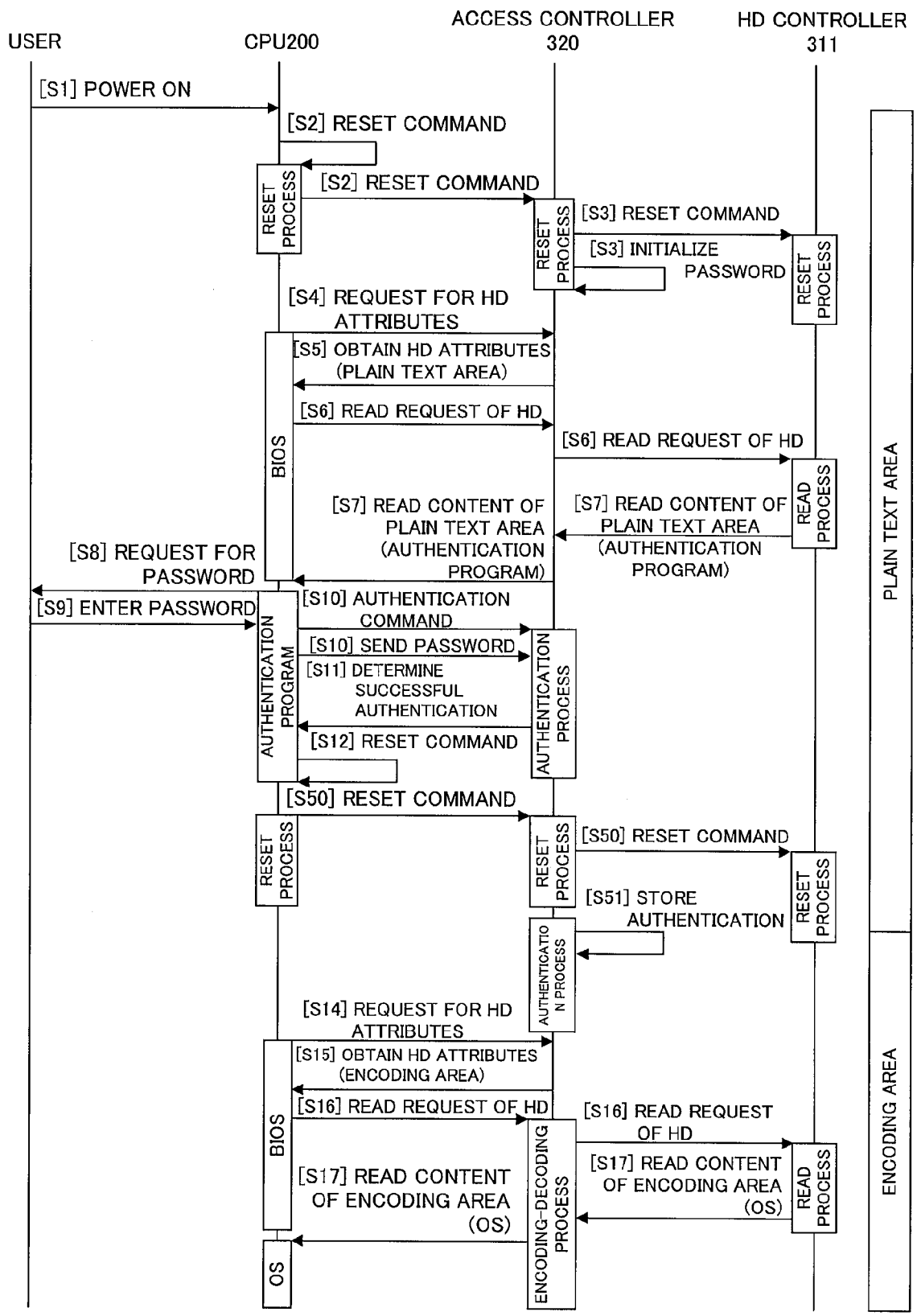
FIG. 7 is a sequence diagram showing a flow of an OS activation process implemented in a second embodiment.

FIG. 7 is a sequence diagram showing a flow of an OS activation process implemented in a second embodiment. The differences from the OS activation process of the first embodiment shown in FIG. 4 are that the storage of the authentication information as part of step S11 is replaced by the processing of step S51 and that the processing of steps S12 and S13 is replaced by the processing of step S50. Otherwise the control flow of the second embodiment is similar to that of the first embodiment. A hard disk 300 of the second embodiment does not include the OS state storage unit 326 but otherwise has a similar structure to that of the hard disk 300 of the first embodiment.

After the successful authentication by the authentication program 441, the CPU 200 resets the CPU 200 itself and issues a reset command to the access controller 320. The reset command is issued to allow for activation of the OS 902. In response to reception of the reset command, the access controller 320 issues a reset command to the HD controller 311 (step S50). After completion of the reset process, the access controller 320 stores the authentication information (step S51).

As described above, the control flow of the second embodiment stores the status of successful authentication into the authentication state storage unit, after performing the reset process of the storage device. Such control effectively prevents the storage device from being reset in the state of storage of the authentication information. This arrangement desirably protects the authentication information from being deleted in the course of the reset process.

C. Third Embodiment

Figure 8:
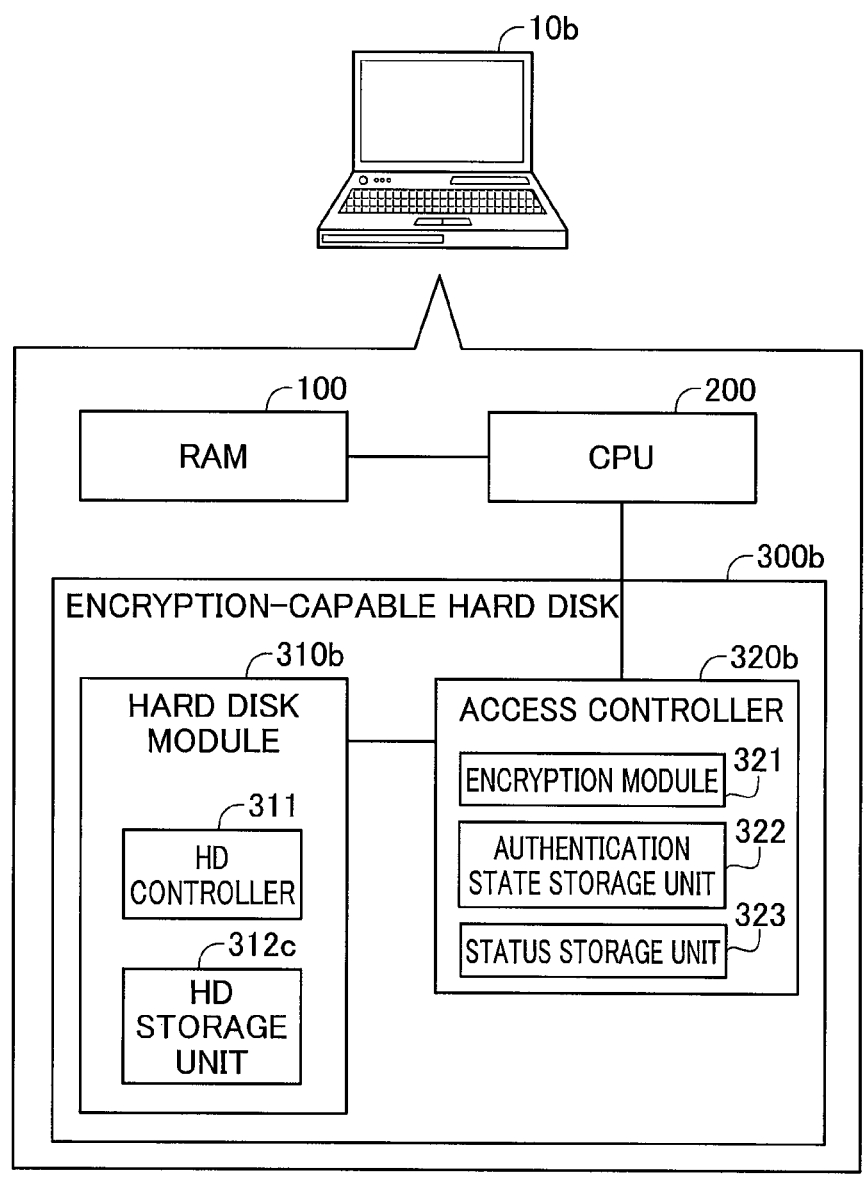
FIG. 8 is an explanatory view schematically illustrating the configuration of an information processing apparatus connecting with a storage device in accordance with a third embodiment.

FIG. 8 is an explanatory view schematically illustrating the configuration of an information processing apparatus connecting with a storage device in accordance with a third embodiment. A hard disk 300b of the third embodiment does not have the ROM 330 (FIG. 1). As described below in detail, the differences from the configuration of the second embodiment include the internal structures of a hard disk module 310b and an HD storage unit 312c and the sequence of control operations implemented by an access controller 320b.

Figure 9:
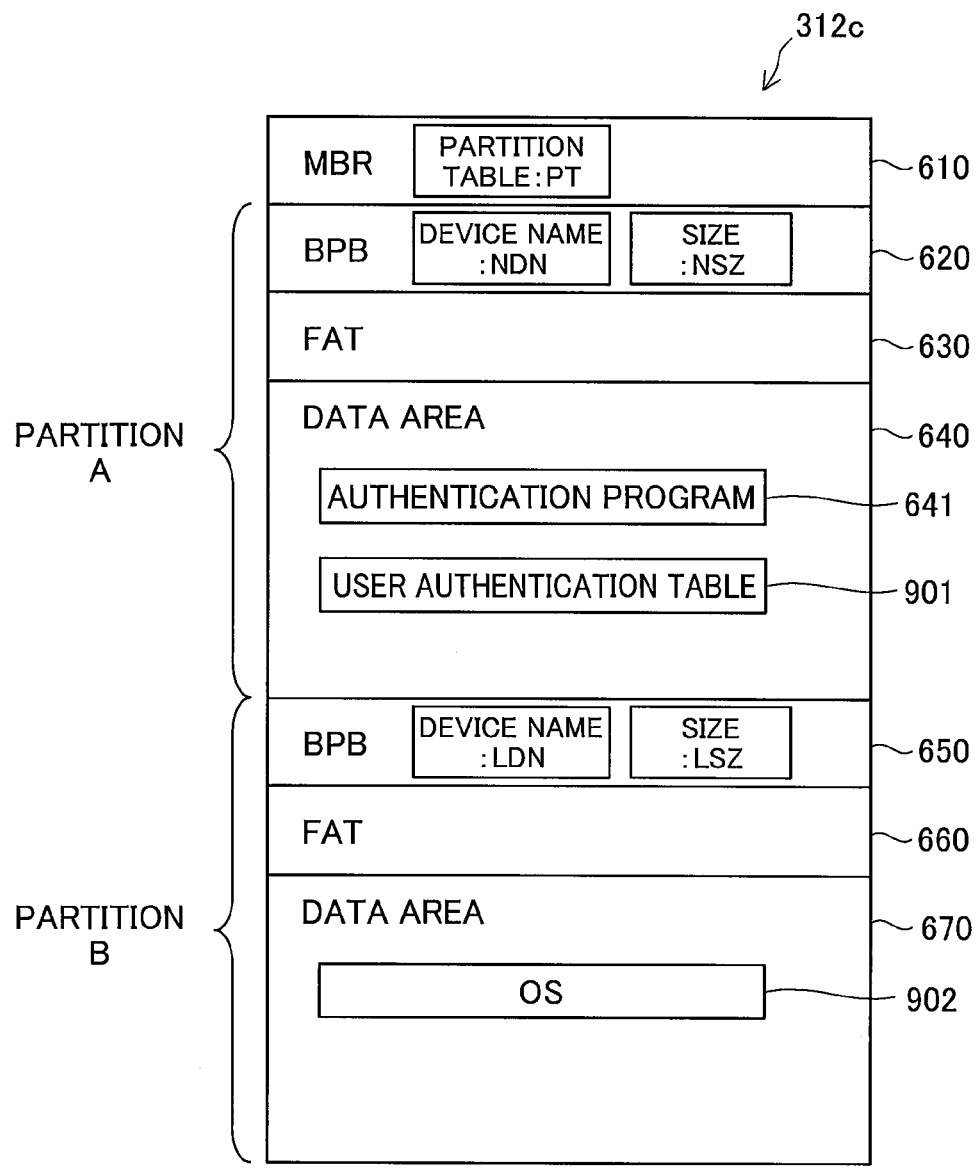
FIG. 9 is an explanatory view showing the schematic structure of the HD storage unit in the third embodiment.

FIG. 9 is an explanatory view showing the schematic structure of the HD storage unit 312c in the third embodiment. The primary difference from the configuration of the second embodiment (FIG. 2) is that the HD storage unit 312c of the third embodiment is divided into a partition A as the authentication storage area and a partition B as the operating system storage area. An MBR 610 has a partition table PT to be referred to for management of the partitions A and B. The partition table PT stores in advance information representing starting positions and terminal positions of the respective partitions A and B, as well as information for specifying which of the partitions A and B is an active partition representing an active area. In the following description of this embodiment, it is assumed that the partition A (authentication storage area) is set to a default active partition.

The partition A includes a BPB 620, an FAT 630, and a data area 640. The partition B includes a BPB 650, an FAT 660, and a data area 670. An authentication program 641 and a user authentication table 901 are stored in advance in the data area 640 of the partition A. An OS 902 used on a PC 10b is stored in advance in an encrypted state in the data area 670 of the partition B.

Figure 10:
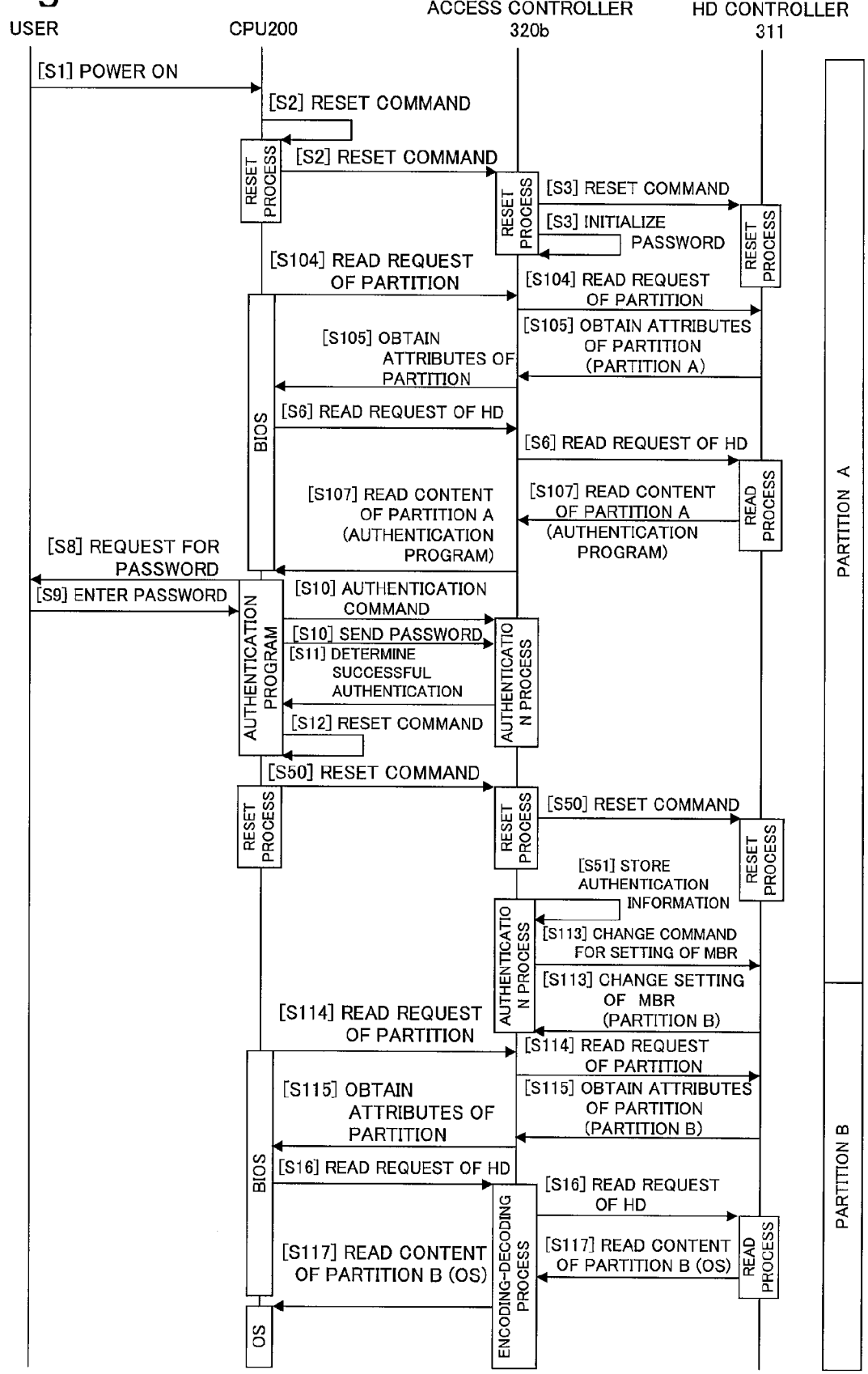
FIG. 10 is a sequence diagram showing a flow of an OS activation process implemented in the third embodiment.

FIG. 10 is a sequence diagram showing a flow of an OS activation process implemented in the third embodiment. The differences from the OS activation process of the second embodiment shown in FIG. 7 are discussed below. The steps that are not specifically explained here (that is, the steps in FIG. 10 expressed by the same step numbers as those in FIG. 7) are identical with those of the second embodiment.

In response to reception of a read request of a partition (step S104), an HD controller 311 sends back a device name NDN and a device size NSZ stored in the BPB 620 of the partition A (FIG. 9) (step S105 in FIG. 10). In response to subsequent reception of a read request of a hard disk in the partition A (step S6), the HD controller 311 sends the authentication program 641 stored in the data area 640 of the partition A via the access controller 320b (step S107). The authentication process implemented according to the authentication program 641 in the third embodiment is identical with the authentication process implemented in the first embodiment (FIG. 4).

After completion of a reset process at step S50, the access controller 320b stores the authentication information (step S51). The access controller 320b subsequently issues a command to the HD controller 311 to change the active partition set in the partition table PT to the partition B (step S113).

In response to reception of a read request of the partition from the BIOS after the reset process of the CPU 200 (step S114), the access controller 320b issues a read request of the partition to the HD controller 311 (step S114). In response to reception of the read request of the partition, the HD controller 311 sends back a device name LDN and a device size LSZ of the partition B (FIG. 9) currently set to the active partition (step S115). In response to subsequent reception of a read request of a hard disk in the partition B from the BIOS (step S16), the HD controller 311 sends the OS 902 of the partition B to the access controller 320b (step S117). The subsequent control operations implemented in the third embodiment are identical with those implemented in the first embodiment.

The hard disk 300b of this embodiment has the storage unit divided into the different partitions, the partition A as the authentication storage area and the partition B as the operating system storage area. Immediately after the PC 10b is powered on, the access controller 320b controls the MBR 610 to set the partition A to the active partition (specifically, to activate the partition A preferentially). After the successful authentication by the authentication program 641, the access controller 320b controls the MBR 610 to set the partition B to the active partition. The CPU 200 is capable of recognizing both the authentication storage area and the operating system storage area, regardless of before and after the authentication process.

As described above, the authentication program is activated and implemented immediately after the information processing apparatus is powered on connecting with the storage device of the third embodiment. After the successful authentication by the authentication program, the operating system is decrypted and activated. This arrangement of the third embodiment enables the OS to be activated, based on the result of authentication according to the authentication program stored in the storage device, and effectively enhances the security of the information stored in the storage device.

D. Fourth Embodiment

Figure 11:
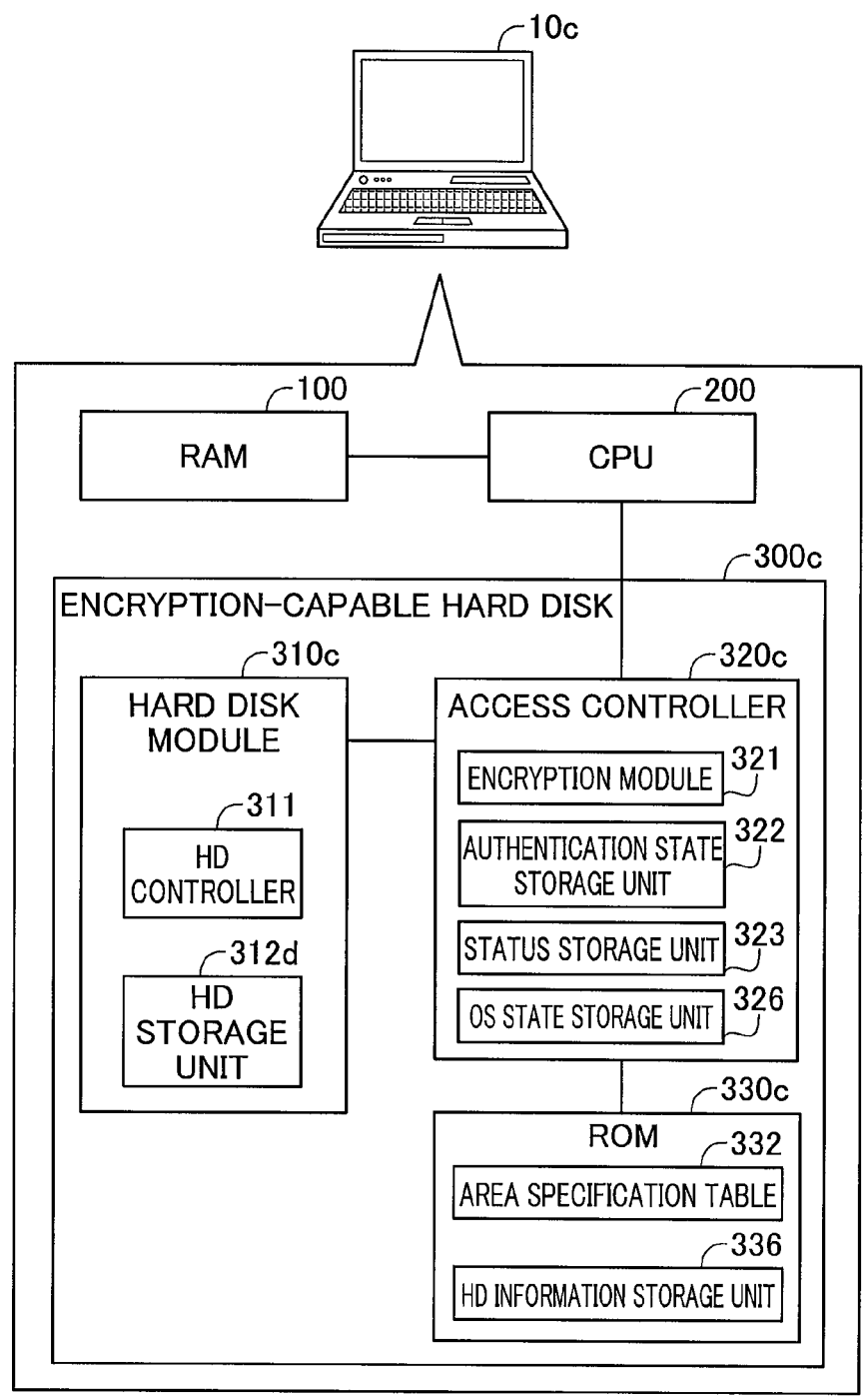
FIG. 11 is an explanatory view schematically illustrating the configuration of an information processing apparatus connecting with a storage device in accordance with a fourth embodiment.

FIG. 11 is an explanatory view schematically illustrating the configuration of an information processing apparatus connecting with a storage device in accordance with a fourth embodiment. A hard disk 300c of the fourth embodiment has a ROM 330c including an area specification table 332, in place of the sector number table 331 (FIG. 1). As described later in detail, the differences from the configuration of the first embodiment include the internal structures of a hard disk module 310c and an HD storage unit 312d and the sequence of control operations implemented by an access controller 320c. Otherwise the configuration of the fourth embodiment is similar to the configuration of the first embodiment.

Figure 12:
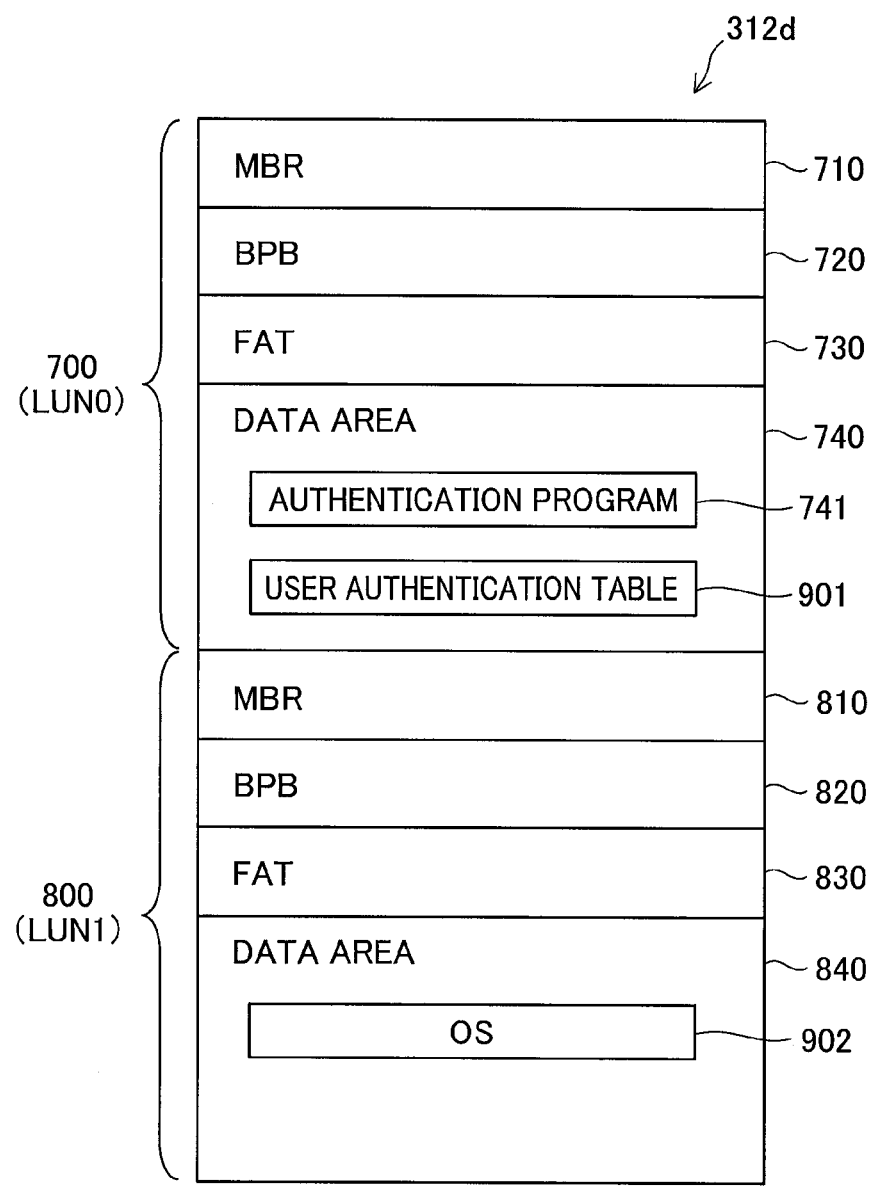
FIG. 12 is an explanatory view showing the schematic structure of the HD storage unit in the fourth embodiment.

FIG. 12 is an explanatory view showing the schematic structure of the HD storage unit 312d in the fourth embodiment. The primary difference from the configuration of the first embodiment shown in FIG. 2 is that the HD storage unit 312d of the fourth embodiment has a first logical unit 700 as the authentication storage area and a second logical unit 800 as the operating system storage area. Logical unit numbers LUN0 and LUN1 are respectively assigned to the logical units 700 and 800 for the purpose of identification of the respective logical units. The logical unit LUN0 has substantially the same structure as that of the plain text area (FIG. 2), and the logical unit LUN1 has substantially the same structure as that of the encoding area (FIG. 2).

FIG. 13 is an explanatory view showing one example of the area specification table 332 after the PC is powered on. The area specification table 332 functioning as an area specification module includes LUN numbers LN given as information relating to assignment of the respective logical units, physical area information, and logical area information. The physical area information includes a total capacity PB, a start address PSA, and an end address PEA. The physical area information represents information on the physical (actual) storage capacity in the HD storage unit 312d. The logical area information includes a total capacity LB, a start address LSA, and an end address LEA. The logical area information represents information on the logical storage capacity in the HD storage unit 312d. In the table of FIG. 13, the total capacity of a physical area is set equal to the total capacity of a logical area. Such setting is, however, not essential, and the total capacity of the logical area may be different from the total capacity of the physical area. An entry having the LUN number LN=0 represents area information relating to the logical unit LUN0 (assigned to the authentication storage area). An entry having the LUN number LN=1 represents area information relating to the logical unit LUN1 (assigned to the operating system storage area). Unless otherwise specified in an explicit manner to the BIOS, the logical unit LUN0 is set to a preferentially activated area. The procedure of this embodiment does not make any explicit setting to the BIOS, so that the logical unit assigned to the authentication storage area is set as a preferentially activated area in the area specification table 332 after the PC is powered on (FIG. 13).

Figure 14:
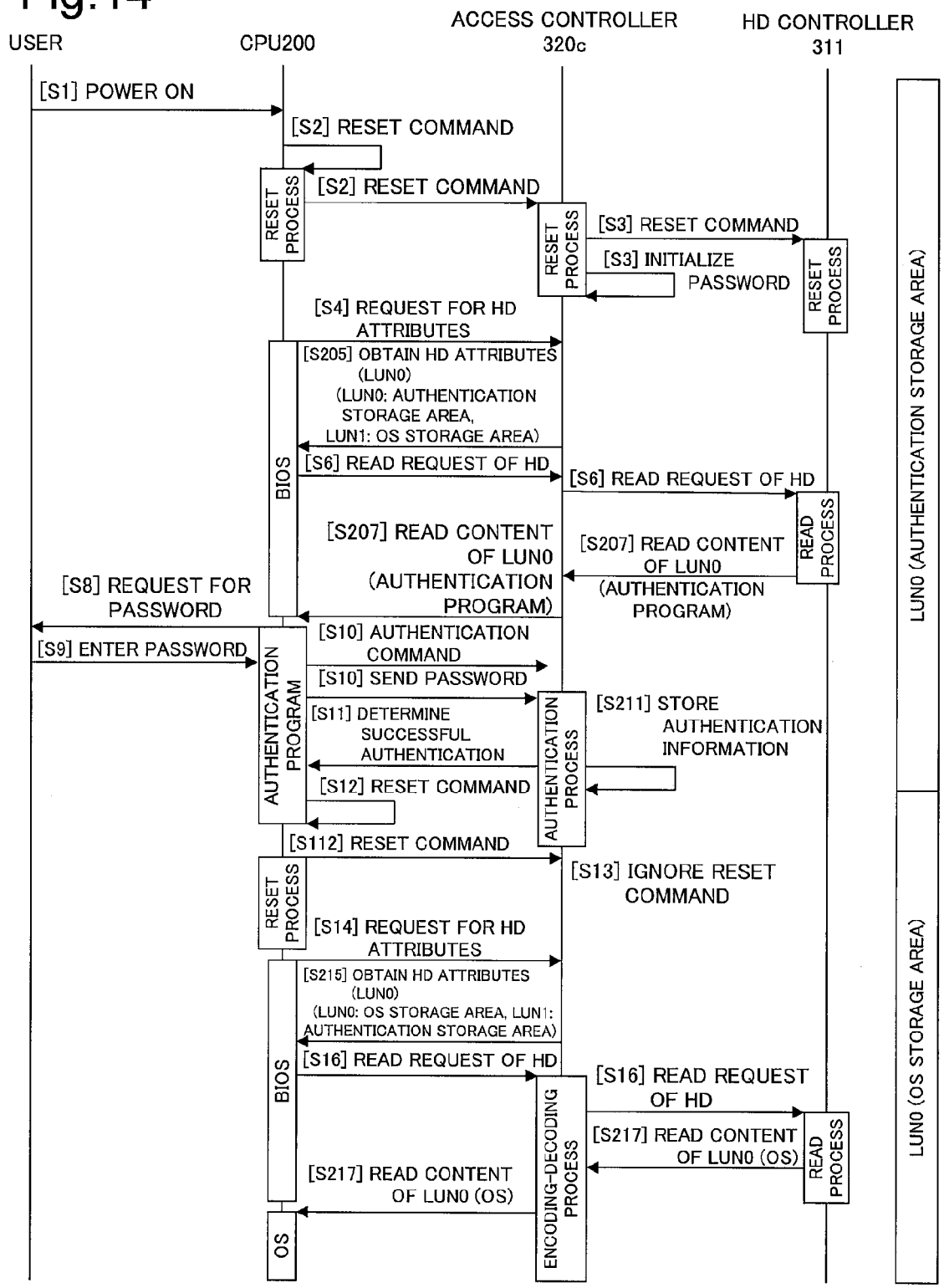
FIG. 14 is a sequence diagram showing a flow of an OS activation process implemented in the fourth embodiment.

FIG. 14 is a sequence diagram showing a flow of an OS activation process implemented in the fourth embodiment. The differences from the OS activation process of the first embodiment shown in FIG. 4 are discussed below. The steps that are not specifically explained here (that is, the steps in FIG. 14 expressed by the same step numbers as those in FIG. 4) are identical with those of the first embodiment.

In response to reception of an attribute request to obtain the attributes of the hard disk (step S4), the access controller 320c sends back a device name and a device size of the LUN0 (assigned to the authentication storage area) stored in an HD information storage unit 336 of the ROM 330c (step S205). In response to subsequent reception of a read request of the hard disk (step S6), an HD controller 311 sends an authentication program 741 stored in a data area 740 of the logical unit LUN0 (assigned to the authentication storage area) via the access controller 320c (step S207). The authentication process implemented according to the authentication program 741 in the fourth embodiment is identical with the authentication process implemented in the first embodiment (FIG. 4).

After the successful authentication by the authentication program 741, the access controller 320c sends back the result of the authentication process to the CPU 200 (step S11). Upon determination of the successful authentication, the access controller 320c stores authentication information. The access controller 320c also changes the settings in the area specification table 332 stored in the ROM 330c (step S211). According to a concrete procedure, the access controller 320c changes the value set in an LUN number LN field of the authentication storage area to '1', while changing the value set in an LUN number LN field for the operating system storage area to '0'. Such change of the settings enables the logical unit assigned to the operating system storage area to be activated preferentially.

Figure 15:
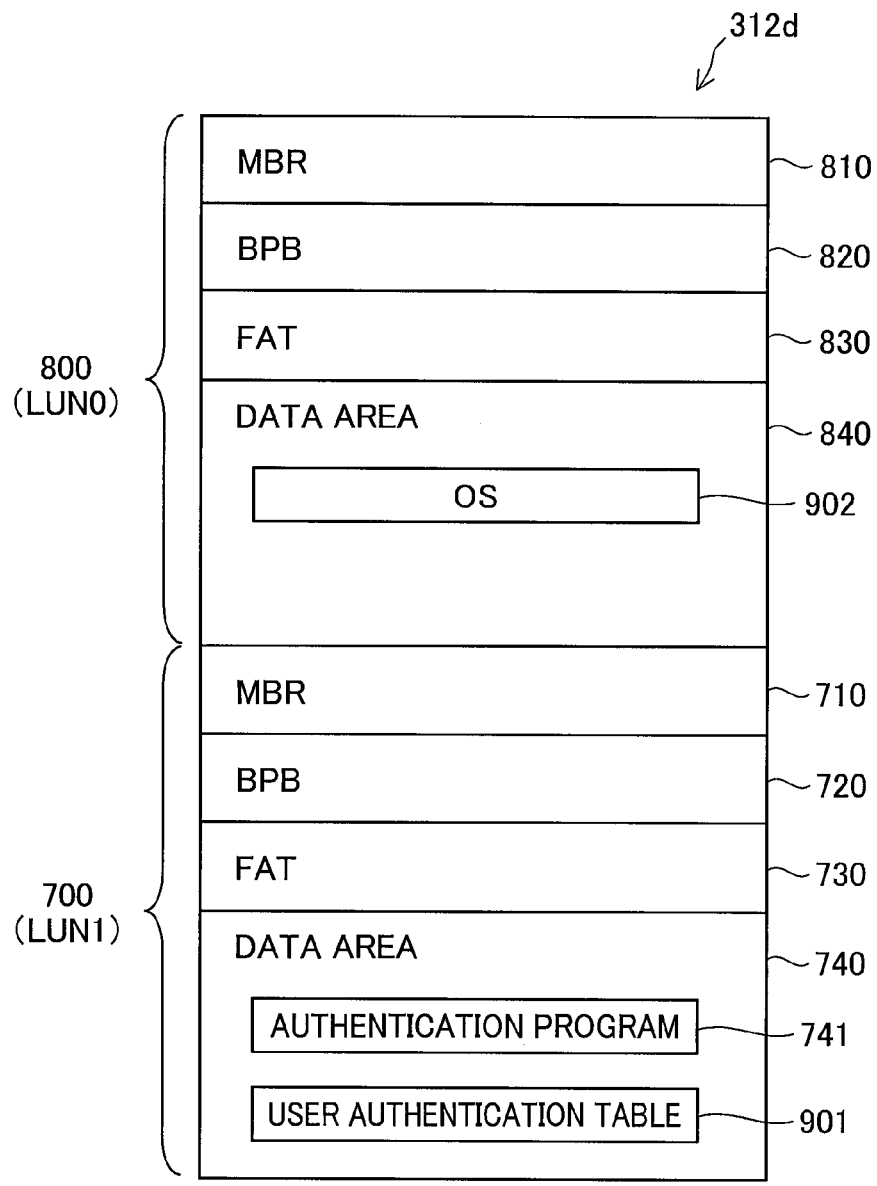
FIG. 15 is an explanatory view showing the schematic structure of the HD storage unit after the change of the settings.

FIG. 15 is an explanatory view showing the schematic structure of the HD storage unit 312d after the change of the settings. In response to reception of an attribute request to obtain the attributes of the hard disk from the BIOS after the reset process of the CPU 200 (step S14), the access controller 320c refers to the storage content in a status storage unit 323. Since the storage content in the status storage unit 323 represents the status of successful authentication, the access controller 320c sends back a device name and a device size of the logical unit LUN0 (assigned to the operating system storage area) stored in the HD information storage unit 336 of the ROM 330c (step S215). In response to subsequent reception of a read request of the hard disk from the BIOS (step S16), the HD controller 311 sends the OS 902 of the logical unit LUN0 (assigned to the operating system storage area) to the access controller 320c (step S217). The subsequent control operations implemented in the fourth embodiment are identical with those implemented in the first embodiment.

The hard disk 300c of this embodiment has the authentication storage area and the operating system storage area assigned to different logical units. After the PC 10c is powered on, the access controller 320c determines the setting of the logical unit number in the area specification table 332 to preferentially activate the logical unit assigned to the authentication storage area. The hard disk recognized by the CPU 200 in this state is the HD storage unit 312d shown in FIG. 12. After the successful authentication by the authentication program 741, the access controller 320c determines the setting of the logical unit number to preferentially activate the logical unit assigned to the operating system storage area. The hard disk recognized by the CPU 200 in this state is the HD storage unit 312d shown in FIG. 15.

The access controller 320c may perform a sequence of access control discussed below, in addition to controlling the priority order of activation of the logical units based on the settings of the logical unit numbers:

After PC 10c is Powered On: The control sends back the attributes of only the logical unit assigned to the authentication storage area, in response to an attribute request from the BIOS (step S4 in FIG. 14). This response makes the logical unit assigned to the authentication storage area accessible, while making the logical unit assigned to the operating system storage area inaccessible.

After Successful Authentication by Authentication Program 741: The control sends back the attributes of only the logical unit assigned to the operating system storage area, in response to an attribute request from the BIOS (step S14 in FIG. 14). This response makes the logical unit assigned to the operating system storage area accessible, while making the logical unit assigned to the authentication storage area inaccessible.

Such access control makes the logical unit assigned to the authentication storage area inaccessible after the successful authentication by the authentication program. This arrangement desirably prevents malfunction of the information processing apparatus (PC).

As described above, the authentication program is activated and implemented immediately after the information processing apparatus is powered on connecting with the storage device of the fourth embodiment. After the successful authentication by the authentication program, the operating system is decrypted and activated. This arrangement of the fourth embodiment enables the OS to be activated, based on the result of authentication according to the authentication program stored in the storage device, and effectively enhances the security of the information stored in the storage device.

E. Fifth Embodiment

Figure 16:
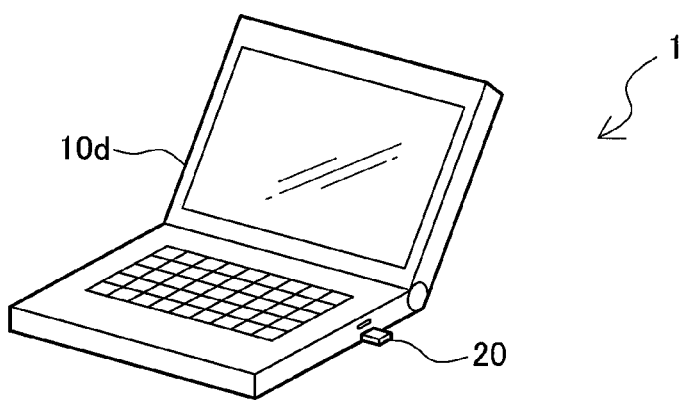
FIG. 16 is an explanatory view showing the appearance of a system including a storage device in accordance with a fifth embodiment.
Figure 17:
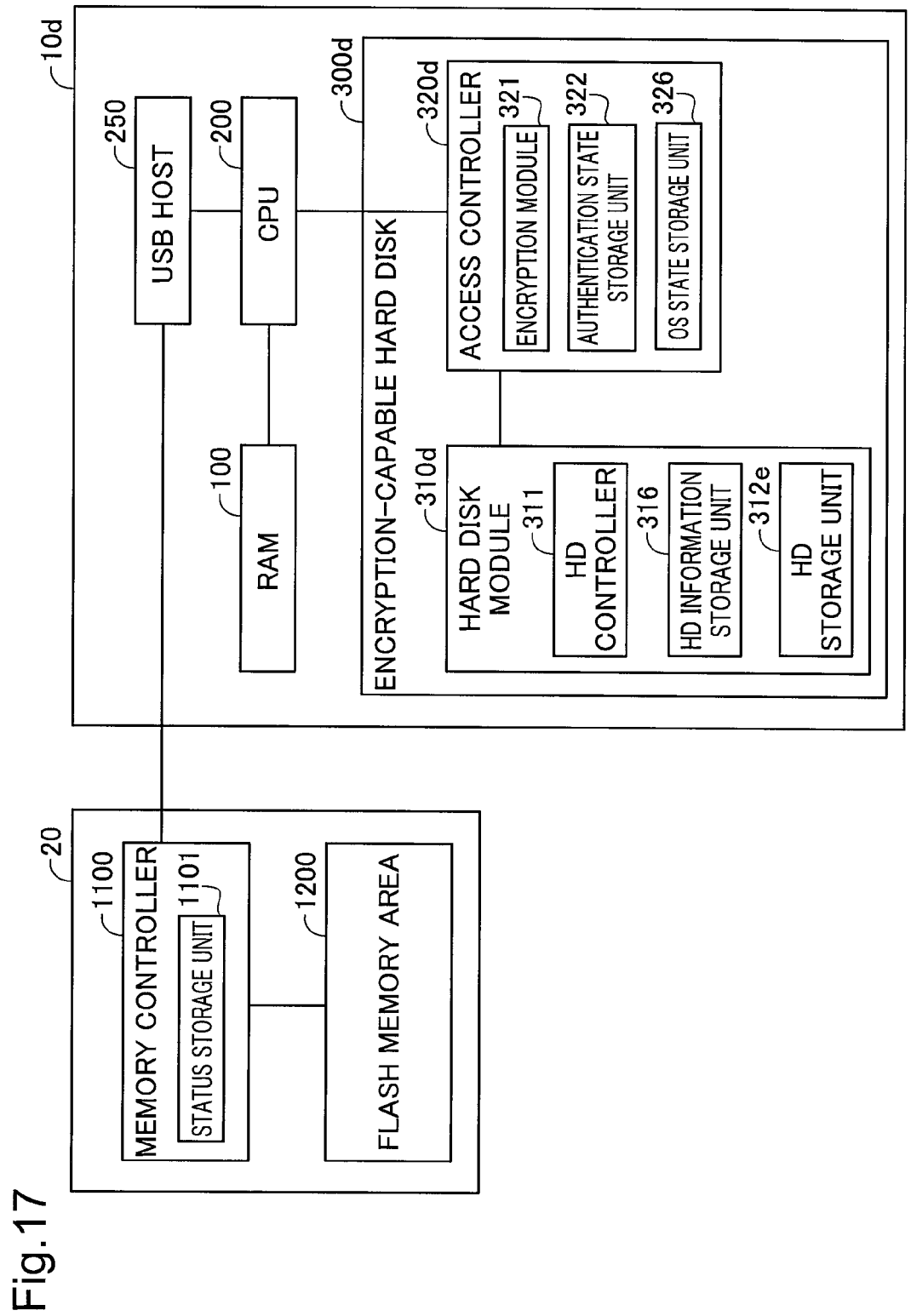
FIG. 17 is an explanatory view schematically illustrating the configuration of the system including the storage device of the fifth embodiment.

FIG. 16 is an explanatory view showing the appearance of a system including a storage device in accordance with a fifth embodiment. FIG. 17 is an explanatory view schematically illustrating the configuration of the system including the storage device of the fifth embodiment. The differences from the configuration of the first embodiment shown in FIG. 1 include a USB flash memory 20 and a USB host 250 as additional components and a hard disk 300d in place of the hard disk 300. Otherwise the configuration and the operations of the system of the fifth embodiment are substantially equivalent to those of the first embodiment.

The USB host 250 functions as a driver of the USB flash memory 20. The hard disk 300d includes a hard disk module 310d and an access controller 320d. The hard disk module 310d includes an HD controller 311, an HD information storage unit 316, and an HD storage unit 312e. The HD information storage unit 316 stores therein attributes of the hard disk including a device name and a device size of the HD storage unit 312e. The access controller 320d includes an encryption module 321, an authentication state storage unit 322, and OS state storage unit 326 as discussed later in detail. The USB flash memory 20 includes a memory controller 1100 and a flash memory area 1200. The flash memory area 1200 is made of a storage medium. The memory controller 1100 is configured to include a status storage unit 1101 and control the operations of the flash memory area 1200.

Figure 18A:
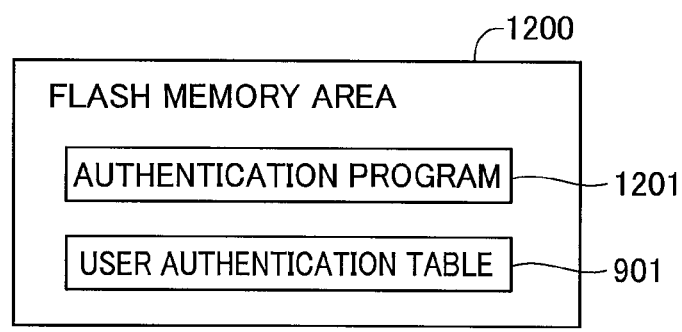
FIGS. 18A and 18B are explanatory views showing the schematic structures of the flash memory area and the HD storage unit in the fifth embodiment.
Figure 18B:
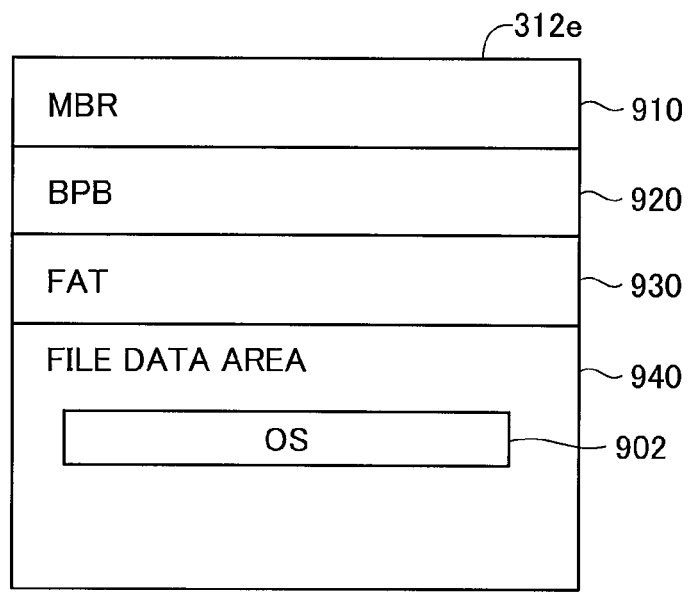

FIGS. 18A and 18B are explanatory views showing the schematic structures of the flash memory area 1200 and the HD storage unit 312e in the fifth embodiment. The primary difference from the configuration of the first embodiment shown in FIG. 2 is that an authentication storage area and an operating system storage area are stored in different media (the USB flash memory 20 and the hard disk 300d) in the configuration of the fifth embodiment. As shown in FIG. 18A, an authentication program 1201 and a user authentication table 901 are stored in advance in the flash memory area 1200 specified as the authentication storage area. The details of the authentication program 1201 will be discussed later. As shown in FIG. 18B, the HD storage unit 312e specified as the operating system storage area includes an MBR 910, a BPB 920, an FAT 930, and a data area 940. An OS 902 used on the PC 10d is stored in advance in an encrypted state in the data area 940.

Figure 19:
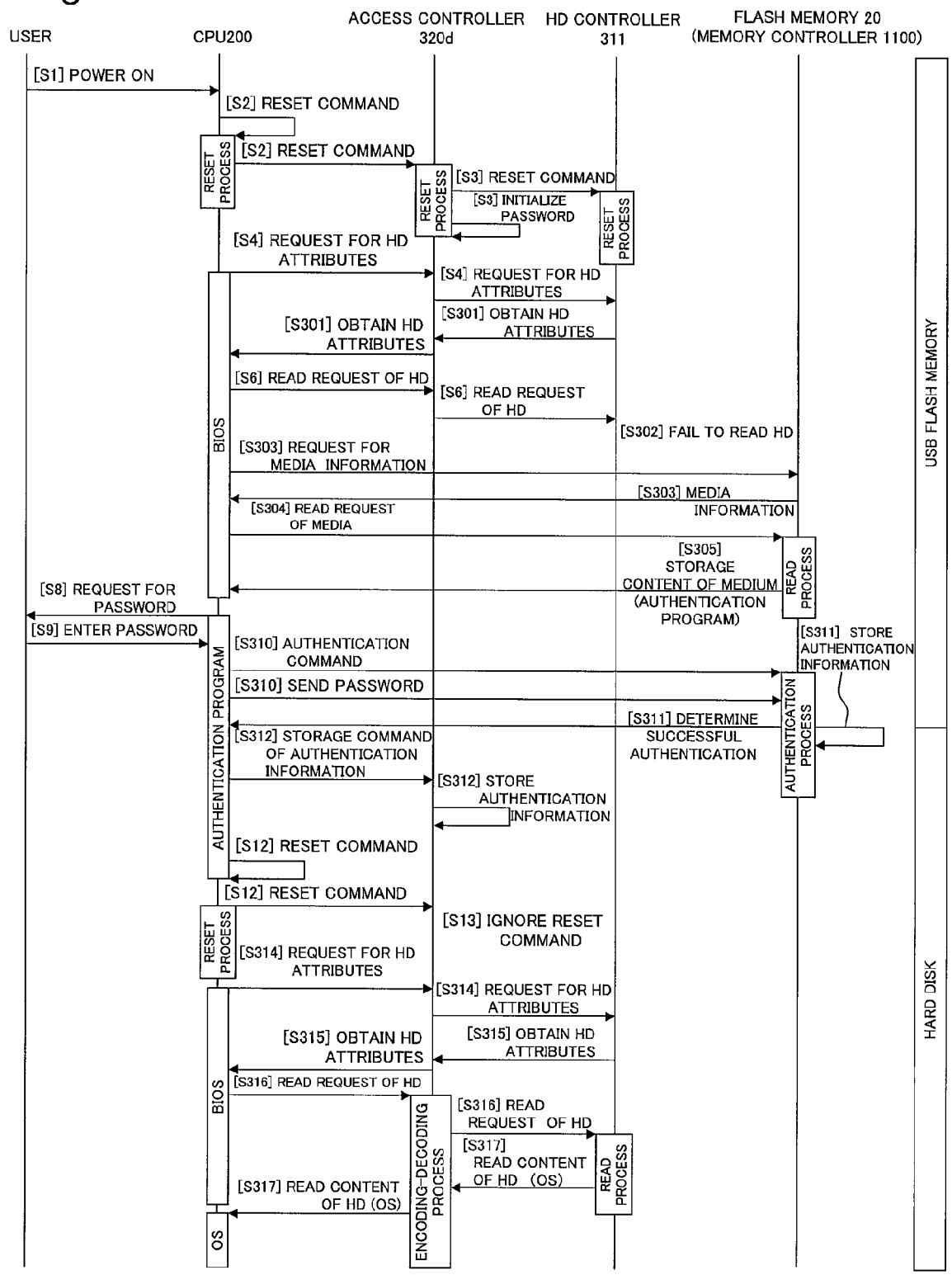
FIG. 19 is a sequence diagram showing a flow of an OS activation process implemented in the fifth embodiment.

FIG. 19 is a sequence diagram showing a flow of an OS activation process implemented in the fifth embodiment. The differences from the OS activation process of the first embodiment shown in FIG. 4 are discussed below. The steps that are not specifically explained here (that is, the steps in FIG. 19 expressed by the same step numbers as those in FIG. 4) are identical with those of the first embodiment.

In response to reception of an attribute request to obtain the attributes of the hard disk (step S4), the HD controller 311 sends back a device name and a device size stored in the HD information storage unit 316 of the hard disk module 310d (step S301 in FIG. 19). The CPU 200 subsequently issues a read request of the hard disk (step S6). The data area 940 is, however, encrypted and is unreadable, so that the CPU 200 fails to read the hard disk (step S302).

The CPU 200 refers to a priority order of activation of the drives by the BIOS and issues a request for media information to the memory controller 1100 included in the USB flash memory 20 (step S303). The CPU 200 obtains the media information and subsequently issues a read request of the medium to the memory controller 1100 (step S304). In response to this read request of the medium, the memory controller 1100 sends the authentication program 1201 stored in the flash memory area 1200 of the storage medium to the CPU 200 (step S305).

The CPU 200 receives the authentication program 1201 and executes the received authentication program 1201 to perform an authentication process. According to a concrete procedure similar to that discussed in the first embodiment, the CPU 200 accepts the user's entries of a user name and a password and sends a value entered in the user name entry field NF and a value entered in the password entry field PF to the memory controller 1100 (step S310). The memory controller 1100 receives the entered values and performs the authentication process with referring to the user authentication table 901 set in the flash memory area 1200 by a procedure similar to that discussed in the first embodiment.

The memory controller 1100 sends back the result of the authentication process to the CPU 200. Upon determination of the successful authentication, the memory controller 1100 stores authentication information (step S311). According to a concrete procedure, the memory controller 1100 stores information representing a status of successful authentication into the status storage unit 1101. The CPU 200 receives the information representing the status of successful authentication and subsequently issues a storage command of the authentication information to the access controller 320d. In response to reception of the storage command, the access controller 320d stores the information representing the status of successful authentication into the authentication state storage unit 322 (step S312).

After the reset process of the CPU 200, the BIOS issues an attribute request to obtain the attributes of the hard disk. The attribute request is sent to the HD controller 311 via the access controller 320d (step S314). In response to the attribute request, the HD controller 311 sends back a device name and a device size stored in the HD information storage unit 316 of the hard disk module 310d (step S315). The BIOS then issues a read request of the hard disk via the access controller 320d (step S316). In response to the read request, the HD controller 311 sends the OS 902 stored in the HD storage unit 312e via the access controller 320d (step S317). The subsequent control operations implemented in the fifth embodiment are identical with those implemented in the first embodiment.

As described above, in the configuration of the fifth embodiment, the access controller decodes the storage content in the HD storage unit after the successful authentication by the authentication program. The authentication program is activated and implemented immediately after the power supply. After the successful authentication by the authentication program, the operating system is decrypted and activated. This arrangement of the fifth embodiment enables the OS to be activated, based on the result of authentication according to the authentication program stored in the storage device, and effectively enhances the security of the information stored in the storage device.

F. Modifications

The embodiments and their applications discussed above are to be considered in all aspects as illustrative and not restrictive. There may be many modifications, changes, and alterations without departing from the scope or spirit of the main characteristics of the present invention. Some examples of possible modification are given below.

F1. Modification 1

In the first embodiment discussed above, some conditions are specified as the conditions for ignoring the reset command sent from the CPU to the access controller. The conditions for ignoring the reset command are, however, not restricted to those specified in the above embodiment but may be determined arbitrarily within the scope of the invention. For example, conditions 1a and 2a or conditions 1b and 2b given below may be set, in place of the conditions 1 through 3 mentioned in the above embodiment:

Condition 1a) The storage content in the authentication state storage unit represents the status of successful authentication; and Condition 2a) The access controller receives a reset command from the CPU in a preset time period (for example, 3 seconds) after the status of successful authentication is stored in the authentication state storage unit.

Condition 1b) The storage content in the authentication state storage unit represents the status of successful authentication; and Condition 2b) A reset command received by the access controller is within a preset ordinal number of reset commands (for example, first through third reset commands) after the status of successful authentication is stored in the authentication state storage unit.

F2. Modification 2

In the first and the second embodiments discussed above, the authentication storage area and the operating system storage area are set to have the identical attributes (for example, the device name and the device size). The access controller directly sends back these identical attributes, in response to an attribute request for the attributes of the hard disk from the BIOS. In one modified application, the authentication storage area and the operating system storage area may be set to have different attributes. The access controller may send back false attributes different from the true attributes, in response to an attribute request for the attributes of the hard disk from the BIOS. By way of example, in response to a request for the device size of the authentication storage area from the BIOS, the access controller may send back a greater device size than the actual device size of the authentication storage area (for example, a size equivalent to the size of the operating system storage area). The BIOS accordingly has the apparent recognition that the authentication storage area and the operating system storage area have the identical attributes. This modified arrangement thus effectively prevents an unnecessary expansion of the actual device size of the authentication storage area.

F3. Modification 3

In the fourth embodiment discussed above, both the authentication storage area and the operating system storage area are controlled to be visible from the information processing apparatus. In one modified application, the access controller may perform a sequence of control operations to make the authentication storage area visible immediately after the information processing apparatus is powered on and to make the authentication storage area invisible after the successful authentication by the authentication program. According to a concrete procedure, like the procedure of the first embodiment, the access controller may specify the content of a reply to the attribute request for the attributes of the hard disk from the CPU (determine whether a reply includes the attributes of the authentication storage area or includes the attributes of the operating system storage area). This modified arrangement effectively prevents malfunction of the information processing apparatus at the time of activation of the OS after the successful authentication.

F4. Modification 4

In the first, the fourth, and the fifth embodiments discussed above, under storage of the status of the successful authentication, the access controller ignores a reset command issued for activation of the operating system. In the second and the third embodiments discussed above, on the other hand, the access controller performs the reset process in response to a reset command issued for activation of the operating system, prior to storage of the status of successful authentication into the authentication state storage unit. These different control operations are, however, not characteristic of the control flows of the respective embodiments. Either of the control operations may be implemented in combination with any of the control flows of the above embodiments.

F5. Modification 5

In the embodiments discussed above, the OS is stored in advance in an encrypted state in the operating system storage area. Such encryption technique is not restricted to the OS but may be applicable to arbitrary user data. In one modified application, the system configuration may be designed for encryption of arbitrary user data, as well as for encryption of the OS. In this application, at the time of writing user data, the encryption module encodes the user data and stores the encoded user data. At the time of reading user data, the encryption module decodes the stored user data and reads out the decoded user data according to a procedure similar to the procedure of reading the OS discussed above. This modified arrangement desirably enhances the security of user data as well as the OS.

F6. Modification 6

The system of the fifth embodiment described above asks the user to enter a password. In one modified application, a password may be stored in advance in the USB flash memory. This modified arrangement allows for omission of the user's entry of the password. The USB flash memory of this modified arrangement functions itself as a key.

F7. Modification 7

In the first through the fourth embodiments discussed above, the hard disk is explained as one typical example of the storage device. In the fifth embodiment discussed above, the USB flash memory is explained as one typical example of the storage medium including the authentication storage area. These examples are, however, only for the illustrative purpose and are not at all restrictive. The principle of the invention is also applicable to diversity of other storage devices and other storage media. By way of example, the hard disk may be replaced with an SSD (solid state drive). The USB flash memory may be replaced with, for example, an SD card, a CD-ROM, or a DVD-ROM.

What is claimed is:

1. A device used in connection with an information processing apparatus, comprising:
    a storage device including:
        an authentication storage area storing an authentication program in advance, wherein the authentication program is executed to authenticate whether each user operating the information processing apparatus is an approved user;
        an operating system storage area storing an operating system in advance, wherein the operating system is encrypted and is used by the information processing apparatus;
        an access controller that controls information process apparatus accesses to the authentication storage area and the operating system storage area; and
    a decoder configured to decrypt the encrypted operating system,
    wherein the storage device being configured to make one of the authentication storage area and the operating system storage area visible and the other area invisible from the information processing apparatus, and the authentication storage area and the operating system storage area are set to have identical attributes including a device name and a device size,
    wherein after the information processing apparatus is powered on, the access controller makes the authentication storage area visible and the operating system storage area invisible, thereby allowing the authentication program to be activated and implemented on the information processing apparatus, and after the successful authentication by the authentication program, the access controller makes the authentication storage area invisible and the operating system storage area visible and controls the decoder to decrypt the operating system, thereby allowing the operating system to be activated and implemented on the information processing apparatus.

2. The device according to claim 1, the storage device further including an authentication state storage unit configured to store a result of authentication, wherein after the successful authentication by the authentication program, when a reset command issued for activation of the operating system is received from the information processing apparatus subsequent to storage of the status of successful authentication into the authentication state storage unit, the access controller ignores the reset command under a condition of recognizing both the storage of the status of successful authentication in the authentication state storage unit and inactivation of the operation system on the information processing apparatus.

3. The device according to claim 1, the storage device further including an authentication state storage unit configured to store a result of authentication, wherein the access controller resets the storage device in response to a reset command issued for activation of the operating system from the information processing apparatus and subsequently stores the status of successful authentication into the authentication state storage unit.

4. A device used in connection with an information processing apparatus, comprising:

a storage device including:

an authentication storage area storing an authentication program in advance, wherein the authentication program is executed to authenticate whether each user operating the information processing apparatus is an approved user;

an operating system storage area storing an operating system in advance, wherein the operating system is encrypted and is used by the information processing apparatus;

an access controller that controls information process apparatus accesses to the authentication storage area and the operating system storage area; and a decoder configured to decrypt the encrypted operating system, wherein the storage device being configured to make one of the authentication storage area and the operating system storage area visible and the other area invisible from the information processing apparatus, wherein after the information processing apparatus is powered on, the access controller makes the authentication storage area visible and the operating system storage area invisible, thereby allowing the authentication program to be activated and implemented on the information processing apparatus, after the successful authentication by the authentication program, the access controller makes the authentication storage area invisible and the operating system storage area visible and controls the decoder to decrypt the operating system, thereby allowing the operating system to be activated and implemented on the information processing apparatus, and in response to an attribute request for an attribute including a device size of the authentication storage area from the information processing apparatus, the access controller sends back a false device size that is greater than an actual device size of the authentication storage area.

\* \* \* \* \*